United States Patent
Mate

(10) Patent No.: US 7,609,473 B1
(45) Date of Patent: Oct. 27, 2009

(54) DISSIPATION OF LIQUID DROPLETS IN A MAGNETIC DISK DRIVE

(75) Inventor: Charles M. Mate, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 12/120,171

(22) Filed: May 13, 2008

(51) Int. Cl.
G11B 21/02 (2006.01)
G11B 19/02 (2006.01)
G11B 19/04 (2006.01)

(52) U.S. Cl. .............................. 360/75; 360/69; 360/60

(58) Field of Classification Search .................. None
See application file for complete search history.

(56) References Cited

U.S. PATENT DOCUMENTS

| | | | |
|---|---|---|---|
| 4,620,248 A | 10/1986 | Gitzendanner | |
| 4,837,648 A | 6/1989 | Yamauchi | |
| 5,390,059 A | 2/1995 | Tokuyama et al. | |
| 5,436,776 A | 7/1995 | Kurokawa | |
| 6,853,508 B2 | 2/2005 | Smith et al. | |
| 7,046,469 B2 | 5/2006 | Tanaka | |
| 2001/0012170 A1* | 8/2001 | Yotsuya et al. | 360/75 |
| 2005/0270679 A1* | 12/2005 | Victor et al. | 360/69 |
| 2007/0165322 A1 | 7/2007 | Strom et al. | |

FOREIGN PATENT DOCUMENTS

| | | |
|---|---|---|
| JP | 61080574 | 4/1986 |
| JP | 1208789 | 8/1989 |
| JP | 2139776 | 5/1990 |
| JP | 2162584 | 6/1990 |
| JP | 2193387 | 7/1990 |

OTHER PUBLICATIONS

Fowler et al., "Observation of Slider Droplet Formation during Fly Restriction Tests with a Real Time Visualization Instrument," IEEE Transactions on Magnetics, Sep. 1990, abstract, vol. 35, Issue 5, Part 1 Maxtor Corp. USA.

* cited by examiner

*Primary Examiner*—Andrew L Sniezek
(74) *Attorney, Agent, or Firm*—Duft Bornsen & Fishman, LLP

(57) ABSTRACT

Magnetic disk drives and associated methods are described for an improved process for dissipating liquid droplets that may accumulate on a slider of the magnetic disk drive. For the droplet removal process, the slider having the liquid droplet is unloaded from the magnetic disk. For example, the slider may be unloaded from the magnetic disk and onto a ramp assembly. While unloaded from the magnetic disk, a heating power is applied to a TFC heating element in the slider to increase the temperature of the slider. The temperature is increased to a threshold temperature which dissipates any liquid droplets that may have accumulated on the slider. After the liquid droplets have dissipated, the slider may again be loaded onto the magnetic disk.

25 Claims, 4 Drawing Sheets

DISSIPATION OF LIQUID DROPLETS IN A MAGNETIC DISK DRIVE

BACKGROUND OF THE INVENTION

1. Field of the Invention

The invention is related to the field of magnetic disk drives, and in particular, to performing a droplet removal process to dissipate liquid droplets that form on a slider in a magnetic disk drive.

2. Statement of the Problem

Many computer systems use magnetic disk drives for mass storage of information. Magnetic disk drives typically include one or more sliders having a read head and a write head. An actuator/suspension arm holds the slider above the surface of the magnetic disk. When the magnetic disk rotates, an air flow generated by the rotation of the magnetic disk causes an air bearing surface (ABS) side of the slider to fly a particular height above the magnetic disk. As the slider flies on the air bearing, a voice coil motor (VCM) moves the actuator/suspension arm to position the read/write head over selected tracks of the magnetic disk. The read/write head may then read data from or write data to the tracks of the magnetic disk.

As the density of magnetic disks increases, it has become more important to precisely control the spacing between the read/write head and the surface of the magnetic disk. The spacing between the read/write head and the surface of the magnetic disk is often referred to as the fly height of the read/write head. One factor contributing to the fly height is the shape of the ABS of the slider and the rotational speed of the magnetic disk. Another factor contributing to the fly height is the amount of protrusion of the read/write head toward the surface of the magnetic disk.

The read/write head is fabricated from materials that are different than the rest of the slider body. These materials expand and contract at different rates than the slider body. Thus, disk drive manufacturers take advantage of these material properties by embedding one or more heating elements in the read/write head or proximate to the read/write head. The protrusion of the read/write head may thus be precisely controlled by the application of a heating power to the heating element. Controlling the protrusion of a read/write head through the application of a certain heating power to the heating element is referred to herein as Thermal Fly-height Control (TFC).

As the slider flies over the surface of the magnetic disk, the slider may collect a lubricant that is deposited on the surface of the magnetic disk, or may collect other liquids that condense from vapors in the magnetic disk drive. Air flow over the slider surfaces then causes these liquids to accumulate as liquid droplets on low pressure points of the slider. The low pressure points are typically on the ABS of the slider, or on the trailing end of the slider. When the liquid droplets grow to a sufficient size, they can detach from the slider and fall onto the surface of the magnetic disk. If the slider subsequently comes into contact with the liquid droplet, such as on the next revolution of the magnetic disk, the liquid droplet may cause the slider to "jump" temporarily. If the read/write head is in the process of performing a read/write process when the slider jumps, then the data being read or written may be corrupted. Thus, it would be advantageous to remove these liquid droplets from the slider before the liquid droplets fall onto the surface of the magnetic disk.

One solution to the problem is to heat the slider while the slider is in an operating position. The heating of the slider can cause the liquid droplets to dissipate before they fall onto the surface of the magnetic disk. Unfortunately, the air flow caused by the rotation of the magnetic disk and the thermal transfer of energy from the slider to the magnetic disk affects the heating of the slider. It may thus take more power than desired to heat the slider enough to dissipate the liquid droplet.

Another solution to the problem is to heat the slider through the write head in the slider. Because the write head is formed from a coil having a low resistance, it may again take more power than desired to heat the slider enough to dissipate the liquid droplet.

Yet another solution is to stop the rotation of the magnetic disk, and to land the slider on the surface of the magnetic disk. Such a process of landing the slider on the stationary magnetic disk is traditionally referred to as Contact Start-Stop (CSS). When the slider is parked on the surface of the magnetic disk, a current is passed through the slider body which in turn heats the whole slider. The heating of the slider helps to dissipate the liquid droplets that have accumulated. Unfortunately, heating the slider while it is parked on the surface of the magnetic disk may be harmful to the magnetic disk. Also, passing a current through the entire slider body can damage some components in the slider.

SUMMARY

Embodiments of the invention solve the above and other related problems with an improved process for dissipating liquid droplets that may accumulate on a slider. For a droplet removal processes of the embodiments described herein, the slider having the liquid droplet is unloaded from the magnetic disk. For example, the slider may be unloaded from the magnetic disk and onto a ramp assembly. While unloaded from the magnetic disk, a heating power is applied to a TFC heating element in the slider to increase the temperature of the slider. The temperature is increased to a threshold temperature which dissipates any liquid droplets that may have accumulated on the slider. After the liquid droplets have dissipated, the slider may again be loaded onto the magnetic disk.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
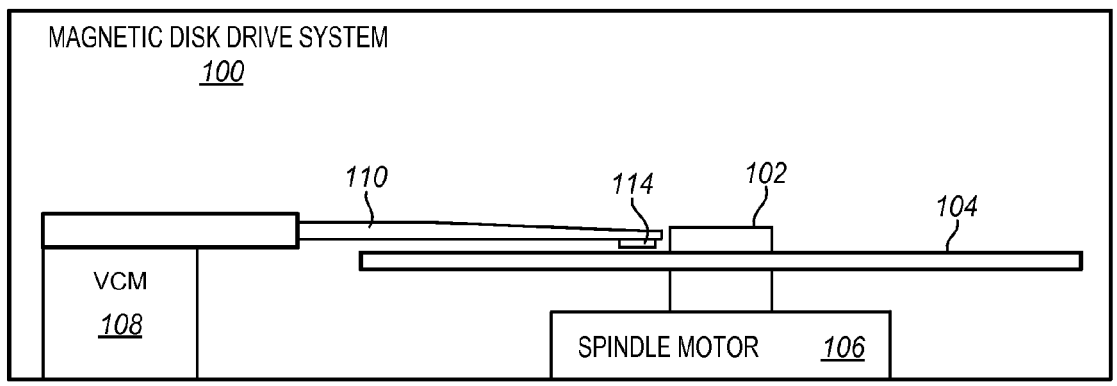
FIG. 1 illustrates a magnetic disk drive.

FIG. 1 illustrates a magnetic disk drive 100 in an exemplary embodiment of the invention. Magnetic disk drive 100 includes a spindle 102 that supports a magnetic disk 104. The spindle 102 is connected to a spindle motor 106 that is operable to rotate spindle 102 responsive to a motor current in order to rotate magnetic disk 104. Magnetic disk drive 100 further includes an actuator/suspension arm 110 that supports a slider 114 over the surface of magnetic disk 104. Although not visible in FIG. 1, slider 114 includes a read/write head proximate to its trailing end. Actuator/suspension arm 110 is connected to a voice coil motor (VCM) 108 that is operable to pivot actuator/suspension arm 110 responsive to a VCM current in order to position the read/write head of slider 114 over desired tracks of magnetic disk 104. Magnetic disk drive 100 may include other devices, components, or systems not shown in FIG. 1. For instance, magnetic disk drive 100 may include a plurality of magnetic disks 104 connected to spindle 102 and a plurality of actuator/suspension arms 110 supporting sliders 114 over the surface of the magnetic disks 104.

Figure 2:
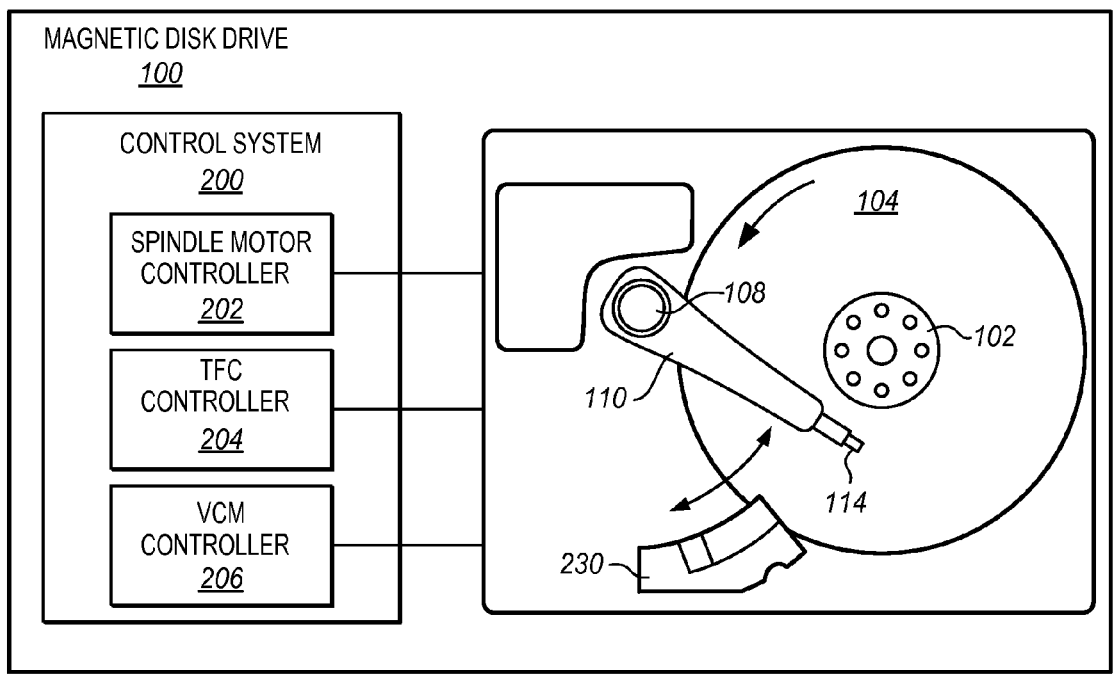
FIG. 2 is a top view of a magnetic disk drive.

FIG. 2 is a top view of magnetic disk drive 100 in an exemplary embodiment of the invention. In this view, magnetic disk drive 100 further includes a control system 200. Control system 200 includes a spindle motor controller 202 that is operable to apply a motor current to spindle motor 106 (not visible in FIG. 2), which controls the rotational speed of magnetic disk 104. Control system 200 further includes a TFC controller 204 that is operable to apply a heating power to one or more TFC heating elements (not shown) in slider 114 in order to control the amount of protrusion of the read/write head. Control system 200 further includes a VCM controller 206 that is operable to apply a positional voltage to VCM 108 to control the position of actuator/suspension arm 110. Although a VCM controller 206 is illustrated in this embodiment, those skilled in the art will appreciate that any type of motor controller may be used to control the position of actuator/suspension arm 110.

Control system 200 further includes a ramp assembly 230. Instead of using Contact Start-Stop (CSS) functionality, magnetic disk drive 100 uses ramp load/unload functionality. For ramp load/unload functionality, slider 114 is moved off of magnetic disk 104 by VCM controller 206 prior to power down, as indicated by the arrow. Slider 114 is moved onto a ramp assembly 230 and safely positioned on ramp assembly 230 while magnetic disk drive 100 is powered down. Moving slider 114 from a position proximate to the surface of the magnetic disk 104 to ramp assembly 230 is referred to as "unloading" the slider 114 from magnetic disk 104. When magnetic disk drive 100 subsequently powers on, slider 114 is again moved off of ramp assembly 230 when magnetic disk 104 reaches the appropriate rotational speed. Moving slider 114 from ramp assembly 230 to a position proximate to the surface of the magnetic disk 104 is referred to as "loading" the slider 114 onto magnetic disk 104.

Figure 3:
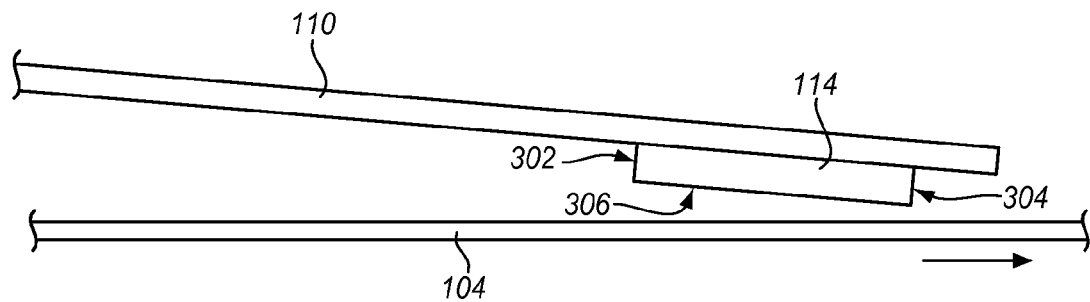
FIG. 3 is a side view of a magnetic disk drive.

FIG. 3 is a side view of magnetic disk drive 100 in an exemplary embodiment of the invention. Slider 114 is supported above the surface of magnetic disk 104 by actuator/suspension arm 110. Slider 114 includes a front end 302 and an opposing trailing end 304 (which is also referred to as a deposited end). Slider 114 also includes an air bearing surface (ABS) 306 that faces toward the surface of magnetic disk 104. A read/write head is fabricated proximate to the trailing end 304. Slider 114 also includes one or more TFC heating elements that are fabricated in slider 114 proximate to the read/write head, which is illustrated in FIG. 4.

Figure 4:
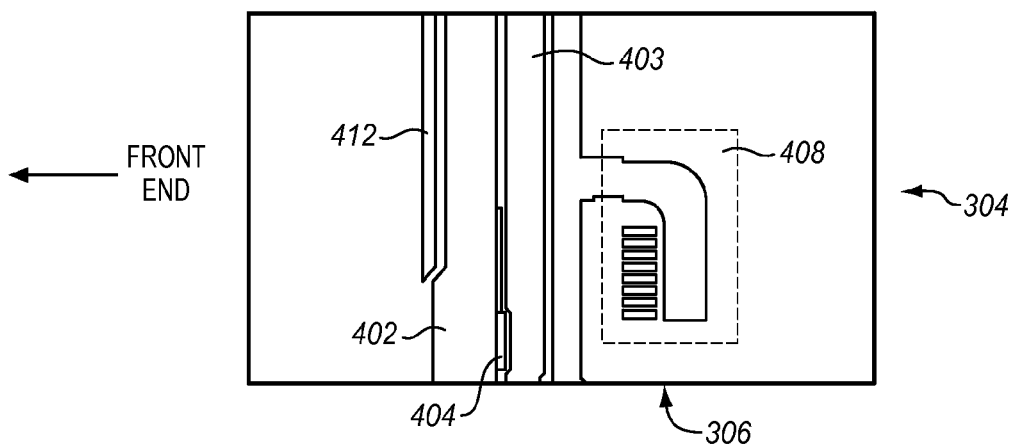
FIG. 4 is a cross-sectional view of a trailing end of a slider.

FIG. 4 is a cross-sectional view of the trailing end 304 of slider 114 in an exemplary embodiment of the invention. Trailing end 304 includes the read/write head of slider 114. For the read/write head, the read functionality is performed by a read sensor 404 (e.g., a magnetoresistance sensor) that is sandwiched between a front shield 402 and a back shield 403. The write functionality is performed by a write coil 408. In addition to the read/write head, one or more TFC heating elements 412 are fabricated in or proximate to trailing end 304. Because the materials used to form the read/write head have a different thermal rate of expansion than the remainder of the body of slider 114, TFC heating element 412 can control the amount of protrusion of read/write head relative to the ABS 306 of slider 114. The use of TFC heating element 412 allows for more precise spacing between the read/write head and magnetic disk 104.

Figure 5:
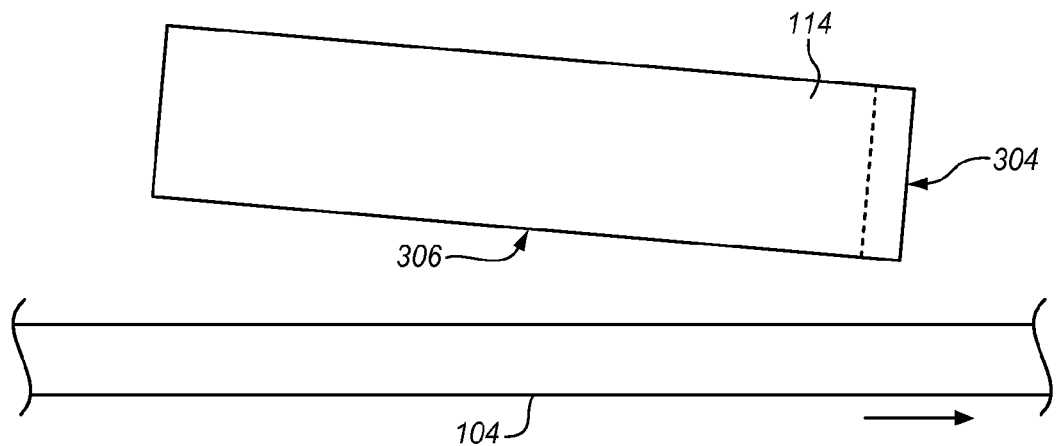
FIG. 5 is a side view of a slider in relation to a magnetic disk with no Thermal Fly-height Control (TFC).

FIG. 5 is a side view of slider 114 in relation to magnetic disk 104 with no TFC. When no heating power is applied to TFC heating element 412 (see FIG. 4) in slider 114, there is no protrusion of the read/write head due to TFC. There may still be protrusion as a result of heating of the trailing end 304 due to other factors, such as heating due to a current through write coil 408, but it is not controlled as with TFC.

Figure 6:
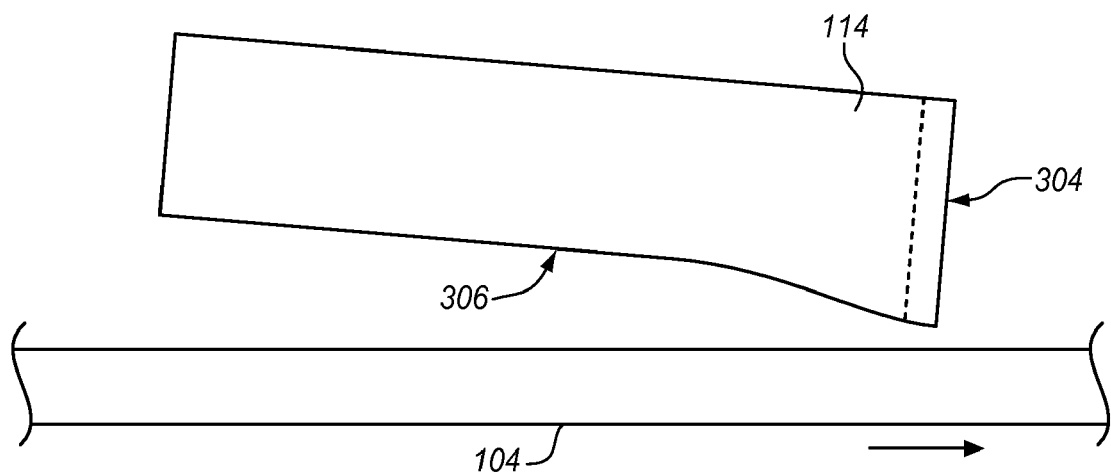
FIG. 6 is another side view of a slider in relation to a magnetic disk with Thermal Fly-height Control (TFC).

When a heating power is applied to TFC heating element 412, the TFC heating element 412 causes the read/write head to protrude from the ABS 306 toward the surface of magnetic disk 104 in a controllable fashion. FIG. 6 is another side view of slider 114 in relation to magnetic disk 104 with TFC. Due to the protrusion of the read/write head, the spacing between the read/write head and the surface of magnetic disk 104 is reduced. Thus, the spacing can be controlled by the amount of heating power applied to TFC heating element 412 by TFC controller 206 (see FIG. 2).

As slider 114 flies over the surface of magnetic disk 104, slider 114 may collect a lubricant from the surface of magnetic disk 104, or may collect other liquids that condense from vapors in magnetic disk drive 100. Air flow over the slider surfaces may cause these liquids to accumulate as liquid droplets on low pressure points of slider 114. The low pressure points are typically on ABS 306 of slider 114, or on trailing end 304 of slider 114.

Figure 7:
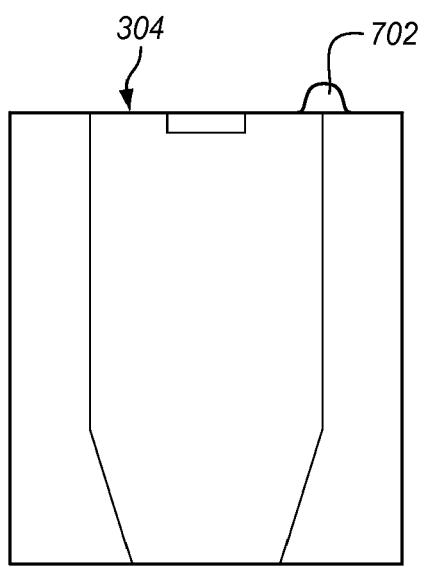
FIG. 7 illustrates a liquid droplet that has accumulated on the trailing end of a slider.

FIG. 7 illustrates a liquid droplet 702 that has accumulated on the trailing end 304 of slider 114. FIG. 7 is a view from the ABS 306 of slider 114. The air flow across ABS 306 typically causes the liquid droplet 702 to accumulate on trailing end 304. However, liquid droplets may form on other low pressure areas of slider 114, such as on ABS 306.

When the liquid droplet 702 grows to a sufficient size, it can detach from slider 114 and fall on the surface of magnetic disk 104. If slider 114 subsequently comes into contact with liquid droplet 702, such as on the next revolution of magnetic disk 104, then the liquid droplet 702 may cause slider 114 to "jump" temporarily which can cause read/write errors. Thus, FIGS. 8-9 and the following description provide an improved process for removing liquid droplets that have formed on the trailing end of sliders.

Figure 8:
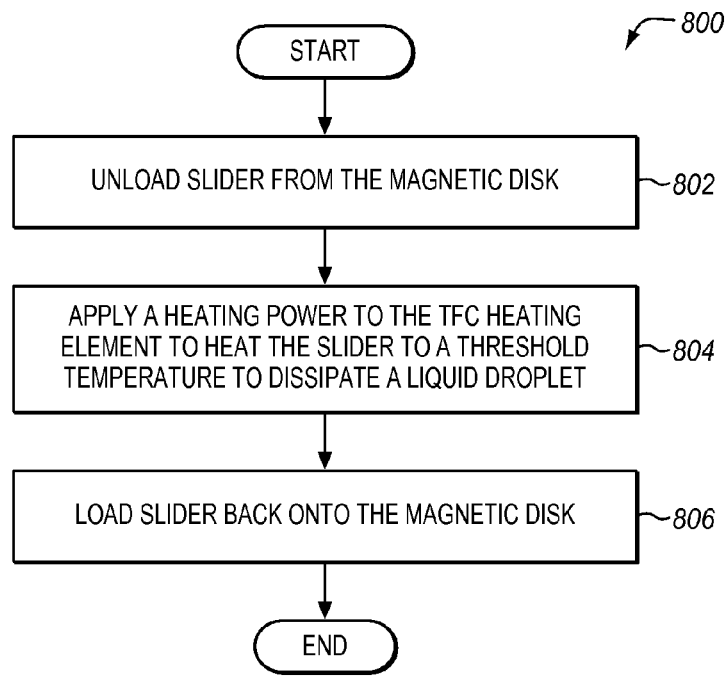
FIG. 8 is a flow chart illustrating a method of performing a droplet removal process in a magnetic disk drive in an exemplary embodiment of the invention.

FIG. 8 is a flow chart illustrating a method 800 of performing a droplet removal process in a magnetic disk drive in an exemplary embodiment of the invention. The droplet removal process may be used to remove a droplet as formed on the trailing end 304 as illustrated in FIG. 7, or to remove a droplet formed on other surfaces of slider 114, such as surfaces on ABS 306. Method 800 will be discussed in relation to the magnetic disk drive 100 shown in FIGS. 1-7, although the method may be implemented in other types of disk drives. The steps of the flow chart in FIG. 8 are not all inclusive and may include other steps not shown.

Figure 9:
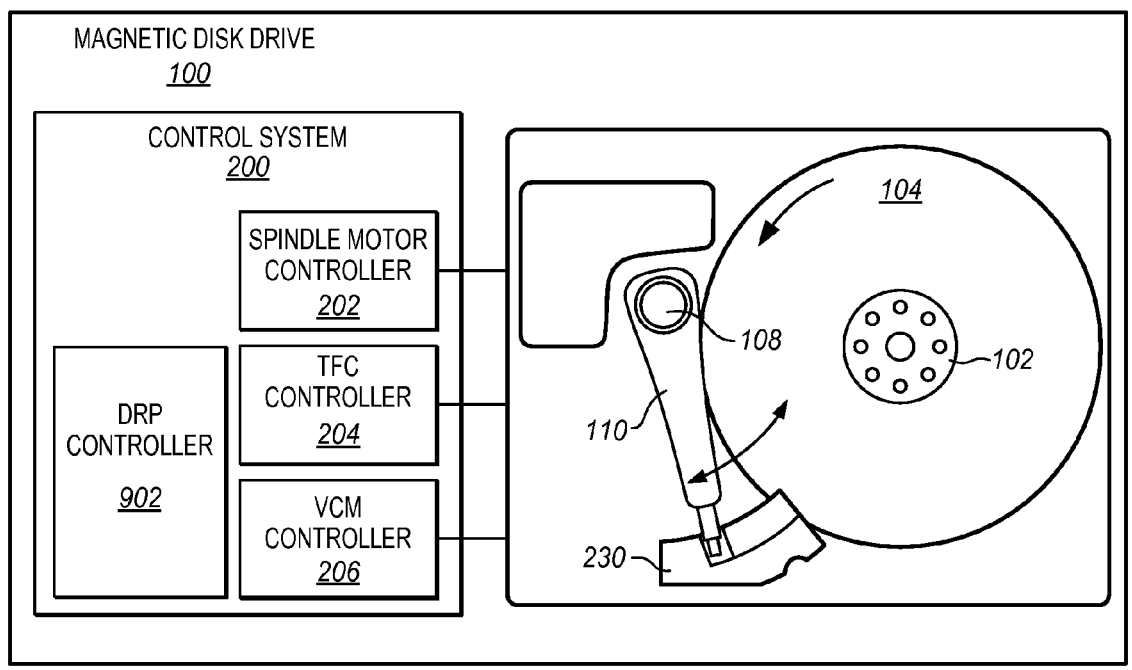
FIG. 9 is a top view of a magnetic disk drive with a slider unloaded from a magnetic disk in an exemplary embodiment of the invention.

In step 802, the slider 114 is unloaded from magnetic disk 104 to initiate the droplet removal process. FIG. 9 is a top view of magnetic disk drive 100 with slider 114 unloaded from magnetic disk 104 in an exemplary embodiment of the invention. To unload slider 114 from magnetic disk 104, VCM controller 106 may apply the appropriate voltage to VCM 108 (see FIG. 1) to cause actuator/suspension arm 110 to swing off of magnetic disk 104 and onto ramp assembly 230. When slider 114 is moved off of magnetic disk 104 and onto ramp assembly 230, slider 114 is considered "unloaded" from magnetic disk 104. There may be other ways of unloading slider 114 from magnetic disk 104. For example, slider 114 may be lifted off of the surface of magnetic disk 104 a threshold distance, such as 1 micron. This type of action may be considered as "unloading" the slider 114. Alternatively, slider 114 may be moved off of magnetic disk 104, but not onto ramp assembly 230. This type of action may also be considered as "unloading" the slider 114.

In step 804 of FIG. 8, a heating power is applied to the TFC heating element 412 in slider 114 to heat slider 114 (or more particularly the trailing end 304) to a threshold temperature to dissipate the liquid droplet 702. The operating parameters used in this step may vary based on a number of factors. For example, the heating power that is applied to TFC heating element 412 and the threshold time period that the heating power is applied are two operating parameters that are determined or defined for the droplet removal process.

The heating power may vary based on the composition of the liquid droplet 702, the size of the liquid droplet 702, the temperature inside of magnetic disk drive 100, etc. To determine the heating power to use for the droplet removal process, TFC controller 204 may use a percentage of the normal operating power of TFC heating element 412 for fly height control. For example, the heating power for the droplet removal process may be in the range of 100-120% of the normal operating power of TFC heating element 412 for fly height control. Alternatively, experimentation may be used to determine the heating power needed to dissipate a liquid droplet 702 of varying compositions as a function of time.

Likewise, the threshold time period that the heating power is applied may vary based on the composition of the liquid droplet 702, the size of the liquid droplet 702, the temperature inside of magnetic disk drive 100, etc. To determine the threshold time period to use for the droplet removal process, experimentation may be used to determine how long on average it takes to dissipate a liquid droplet 702 of varying compositions as a function of heating power. These time periods may then be stored in control system 200, such as in a database structure, so that control system 200 can quickly determine how long to apply a heating power during the droplet removal process. For example, experimentation may show that a liquid droplet 702 primarily composed of Z-Tetraol (a disk lubricant) is dissipated when a heating power of 90 mW-120 mW is applied to TFC heating element 412 for one minute.

When the liquid droplet 702 is dissipated from slider 114, slider 114 is loaded back onto magnetic disk 104 in step 806 (see FIG. 8). For the process of loading slider 114 back onto magnetic disk 104 (see FIG. 9), the heating power may be removed from TFC heating element 412 to allow slider 114 to cool. Alternatively, the heating power may be returned to the normal operating power that is used for fly height control. Also, if magnetic disk 104 was stopped, then spindle motor controller 202 applies the desired motor current to spindle 102 so that magnetic disk 104 reaches the desired rotational speed. With magnetic disk 104 spinning at the desired rotational speed, VCM controller 206 may apply the appropriate voltage to VCM 108 (see FIG. 1) to cause actuator/suspension arm 110 to swing off of ramp assembly 230 and back onto magnetic disk 104. When slider 114 is moved onto magnetic disk 104 and off of ramp assembly 230, slider 114 is considered "loaded" onto magnetic disk 104. FIG. 2 illustrates slider 114 loaded back onto magnetic disk 104.

The droplet removal process may be controlled in magnetic disk drive 100 by droplet removal process (DRP) controller 902. DRP controller 902 is operable to execute the logic to perform the droplet removal process, and to control TFC controller 204 and VCM controller 206 appropriately. DRP controller 902 may be comprised of instructions that are stored on storage media. The instructions can be retrieved and executed by a processor. Some examples of instructions are software, program code, and firmware. The instructions are operational when executed by the processor to direct the processor to operate in accordance with the invention. The term "processor" refers to a single processing device or a group of inter-operational processing devices. Some examples of processors are computers, integrated circuits, and logic circuitry.

The droplet removal process as described in FIG. 8 may be activated, initiated, or performed in a variety of scenarios. For example, the droplet removal process may be performed upon power up of magnetic disk drive 100. When magnetic disk drive 100 is powered down, slider 114 is automatically unloaded from magnetic disk 104 because magnetic disk drive 100 implements ramp load/unload functionality. Thus, when magnetic disk drive 100 is powered on, DRP controller 902 may instruct TFC controller 204 to apply the heating power for the droplet removal process before loading the slider 114 back onto magnetic disk 104. This advantageously ensures that liquid droplets are removed from slider 114 each time magnetic disk drive is powered on.

Alternatively, the droplet removal process may be performed periodically based on threshold time periods. Experimentation may show that a liquid droplet having a size of consequence is formed on the trailing end 304 of slider 114 every 50 minutes of operation. Thus, the droplet removal process may be performed by DRP controller 902 every 50 minutes to dissipate any droplets. In another alternative, the droplet removal process may be performed responsive to detecting the liquid droplet of a threshold size having formed on slider 114. DRP controller 902 may implement laser technology or some other detection means for detecting when a liquid droplet of a threshold size has formed on slider 114. When DRP controller 902 has detected such a liquid droplet, the droplet removal process is performed. Those skilled in the art will appreciate that any combination of the above scenarios for performing the droplet removal process may be used, and that other scenarios for performing the droplet removal process exist that are not discussed for the sake of brevity.

Although specific embodiments were described herein, the scope of the invention is not limited to those specific embodiments. The scope of the invention is defined by the following claims and any equivalents thereof.

I claim:

1. A magnetic disk drive operable to perform a droplet removal process to dissipate liquid droplets formed on a slider during operation, the magnetic disk drive comprising:
   a magnetic disk;
   a slider having a read/write head operable to read data from and write data to the magnetic disk, wherein the slider includes a Thermal Fly-height Control (TFC) heating element operable to cause a protrusion of a read/write head toward the magnetic disk; and
   a control system operable to unload the slider from the magnetic disk to initiate the droplet removal process, to apply a heating power to the TFC heating element in the slider to heat the slider to a threshold temperature to dissipate a liquid droplet, and to load the slider back onto the magnetic disk.

2. The magnetic disk drive of claim 1 further comprising a ramp assembly operable to receive an actuator/suspension arm that is supporting the slider when the slider is unloaded from the magnetic disk.

3. The magnetic disk drive of claim 1 wherein the control system is further operable to perform the droplet removal process upon power up of the magnetic disk drive.

4. The magnetic disk drive of claim 1 wherein the control system is further operable to perform the droplet removal process periodically based on threshold time periods.

5. The magnetic disk drive of claim 1 wherein the control system is further operable to perform the droplet removal process responsive to detecting the liquid droplet of a threshold size having formed on the slider.

6. The magnetic disk drive of claim 1 wherein the control system is further operable to apply the heating power to the TFC heating element which is in the range of approximately 100% to 120% of the normal operating power applied to the TFC heating element.

7. The magnetic disk drive of claim 1 wherein the control system is further operable to apply the heating power to the TFC heating element for a threshold time period depending on the composition of the liquid droplet.

8. A control system of a magnetic disk drive that is operable to perform a droplet removal process to dissipate liquid droplets formed on a slider during operation of the magnetic disk drive, the control system comprising:
   a droplet removal process (DRP) controller operable to instruct a motor controller to unload the slider from a magnetic disk in the magnetic disk drive to initiate the droplet removal process;
   the DRP controller further operable to instruct a TFC controller to apply a heating power to a Thermal Fly-height Control (TFC) heating element in the slider to heat the slider to a threshold temperature to dissipate the liquid droplet;
   the DRP controller further operable to instruct the motor controller to load the slider back onto the magnetic disk.

9. The control system of claim 8 wherein the DRP controller is further operable to instruct the motor controller to unload the slider from the magnetic disk and onto a ramp assembly in the magnetic disk drive.

10. The control system of claim 8 wherein the DRP controller is further operable to perform the droplet removal process upon power up of the magnetic disk drive.

11. The control system of claim 8 wherein the DRP controller is further operable to perform the droplet removal process periodically based on threshold time periods.

12. The control system of claim 8 wherein the DRP controller is further operable to perform the droplet removal process responsive to detecting the liquid droplet of a threshold size having formed on the slider.

13. The control system of claim 8 wherein the DRP controller is further operable to instruct the TFC controller to apply the heating power to the TFC heating element which is in the range of approximately 100% to 120% of the normal operating power applied to the TFC heating element.

14. The control system of claim 8 wherein the DRP controller is further operable to instruct the TFC controller to apply the heating power to the TFC heating element for a threshold time period depending on the composition of the liquid droplet.

15. A method of performing a droplet removal process in a magnetic disk drive to dissipate liquid droplets formed on a slider during operation, the method comprising:
   unloading the slider from a magnetic disk in the magnetic disk drive to initiate the droplet removal process;
   applying a heating power to a Thermal Fly-height Control (TFC) heating element in the slider to heat the slider to a threshold temperature to dissipate a liquid droplet; and
   loading the slider back onto the magnetic disk.

16. The method of claim 15 wherein unloading the slider from a magnetic disk comprises:
   unloading the slider from the magnetic disk and onto a ramp assembly in the magnetic disk drive.

17. The method of claim 15 wherein the droplet removal process is performed upon power up of the magnetic disk drive.

18. The method of claim 15 wherein the droplet removal process is performed periodically based on threshold time periods.

19. The method of claim 15 wherein the droplet removal process is performed responsive to detecting the liquid droplet of a threshold size having formed on the slider.

20. The method of claim 15 wherein applying a heating power to a TFC heating element in the slider comprises:
   applying the heating power to the TFC heating element which is in the range of approximately 100% to 120% of the normal operating power applied to the TFC heating element.

21. The method of claim 15 wherein applying a heating power to a TFC heating element in the slider comprises:
   applying the heating power to the TFC heating element for a threshold time period depending on the composition of the liquid droplet.

22. A magnetic disk drive operable to perform a droplet removal process to dissipate liquid droplets formed on a slider during operation, the magnetic disk drive comprising:
   a magnetic disk;
   a slider having a read/write head operable to read data from and write data to the magnetic disk, wherein the slider includes a Thermal Fly-height Control (TFC) heating element operable to cause a protrusion of a read/write head toward the magnetic disk;
   a ramp assembly; and
   a control system operable to unload the slider from the magnetic disk and onto the ramp assembly to initiate the droplet removal process, to apply a heating power to the TFC heating element in the slider for a threshold time period to heat the slider to a threshold temperature to dissipate a liquid droplet, and to load the slider from the ramp assembly onto the magnetic disk.

23. The magnetic disk drive of claim 22 wherein the control system is further operable to perform the droplet removal process upon power up of the magnetic disk drive.

24. The magnetic disk drive of claim 22 wherein the control system is further operable to perform the droplet removal process periodically based on threshold time periods.

25. The magnetic disk drive of claim 22 wherein the control system is further operable to perform the droplet removal process responsive to detecting the liquid droplet of a threshold size having formed on the slider.

* * * * *